United States Patent
Hu

(10) Patent No.: US 8,273,240 B2
(45) Date of Patent: Sep. 25, 2012

(54) METHOD AND APPARATUS FOR TREATING WASTEWATER CONTAINING EMULSIFIED OIL

(75) Inventor: Deren Hu, Shanghai (CN)

(73) Assignee: Deren Hu, Shanghai (CN)

( * ) Notice: Subject to any disclaimer, the term of this patent is extended or adjusted under 35 U.S.C. 154(b) by 867 days.

(21) Appl. No.: 11/525,195

(22) Filed: Sep. 21, 2006

(65) Prior Publication Data

US 2007/0062881 A1    Mar. 22, 2007

(30) Foreign Application Priority Data

Sep. 22, 2005    (CN) .......................... 2005 1 0029879

(51) Int. Cl.
C02F 1/66    (2006.01)
(52) U.S. Cl. ........................................ 205/760; 205/742
(58) Field of Classification Search .................. 204/268, 204/278, 284, 290; 205/742, 753–754, 758, 205/760
See application file for complete search history.

(56) References Cited

U.S. PATENT DOCUMENTS

| | | | |
|---|---|---|---|
| 774,171 A | 11/1904 | Garrigues | |
| 3,788,967 A | 1/1974 | Kawahata et al. | |
| 3,816,276 A | 6/1974 | Ichiki et al. | |
| 3,915,822 A * | 10/1975 | Veltman | 210/665 |
| 3,969,203 A * | 7/1976 | Ramirez | 205/744 |
| 4,131,526 A | 12/1978 | Moeglich | |
| 4,439,290 A | 3/1984 | Marfurt et al. | |
| 4,927,511 A | 5/1990 | Friehmelt et al. | |
| 5,439,577 A * | 8/1995 | Weres et al. | 204/268 |
| 5,443,700 A | 8/1995 | Hirose et al. | |
| 5,580,464 A | 12/1996 | Bailes | |
| 5,635,112 A * | 6/1997 | Ramesh et al. | 516/176 |
| 5,958,213 A * | 9/1999 | Goto | 205/754 |
| 6,113,765 A | 9/2000 | Wagner et al. | |
| 6,126,838 A | 10/2000 | Huang et al. | |
| 6,136,178 A | 10/2000 | Su et al. | |
| 2004/0035798 A1 * | 2/2004 | Holland | 210/695 |

OTHER PUBLICATIONS

Rajkumar et al. "Electrochemical oxidation of resorcinol for wastewater treatment using Ti/Tio2-RuO2-IrO2 electrode" J. Environ. Sci. Health, A36(10), 1997-2010 (2001).*
M. H. Weintraub et al, Development of Electrolytic Treatment of Oily Wastewater, Environmental Progress, Issue 1, vol. 2, Feb. 1983.

* cited by examiner

*Primary Examiner* — Kaj K Olsen
*Assistant Examiner* — Susan D Leong
(74) *Attorney, Agent, or Firm* — Brinks Hofer Gilson & Lione

(57) ABSTRACT

In one embodiment of the present invention, a method for treating wastewater that contains emulsified oil is provided. The method comprises feeding the wastewater that contains the emulsified oil to an electrolytic tank, and oxidatively electrolyzing the wastewater that contains the emulsified oil using indissoluble electrodes. The negatively charged emulsified oil particles in the wastewater are neutralized on a surface of an anode during the oxidative electrolysis. The anode comprises an indissoluble electrode with oxygen radical-generating characteristics. The method further comprises particle group electrolyzing the wastewater using particle groups, and discharging the treated wastewater.

12 Claims, 4 Drawing Sheets

METHOD AND APPARATUS FOR TREATING WASTEWATER CONTAINING EMULSIFIED OIL

This application claims the benefit of the Chinese Patent Application No. 200510029879.3, filed on Sep. 22, 2005, the entirety of which is incorporated herein by reference.

FIELD OF THE INVENTION

The present invention relates to a method and apparatus for treating wastewater containing emulsified oil.

BACKGROUND OF THE INVENTION

Previously, gravitational segregation and refined separation by filtration adsorption were used for treating oily wastewater from vessels. However, previous treatment equipment did not have the capability to treat emulsified oil contained in oily wastewater and failed to meet the requirements of current shipbuilding specifications. The existing technology was mainly a method of separation by chemical de-emulsification. This prior method required a large area for treatment equipment and produced large amounts of solid sediment that required expensive secondary treatment.

In order to meet the requirements of oily wastewater treatment for vessels, countries all over the world have invested vast human and material resources in research and development. Up to now, only the membrane separation method and the microbial and physical combinative method can actually be used for oily wastewater treatment for vessels. Chiefly employing the principle that water molecules, which are smaller than oil molecules, can pass through the micropores of membranes while the larger oil molecules are prevented from doing so, the membrane separation method separates oil and water in emulsified oil wastewater by means of ultra-filtration under a defined pressure. This method uses numerous kinds of membranes, including inorganic membranes, organic membranes, and inorganic/organic composite membranes. The pressure applied to the membranes during ultra-filtration is about 0.2~0.4 MPa. The disadvantages of the membrane separation method are that the micropores easily become blocked or clogged and the actual lifespan of the membranes is short. Some of the oil molecules also adsorb to the wall of the membranes In the microbial and physical combinative method, after the membrane separation method is performed, microorganisms specifically engineered for consuming hydrocarbons (such as oil) are cultivated and introduced into a biological reactor, together with the previously membrane-separated oily wastewater. With an input oil concentration of 70~90 ppm in the wastewater, output concentration after treatment by the segregator is 15 ppm, which meets the discharge standards. The segregator has a treatment capacity of up to 86,000 gallons per month. Costs of maintenance and replacement are high for membranes, and the costs for the microbial and physical combinative method are also very high. Because of this, it is extremely difficult to promote and generalize the use of these processes in the global shipping industry.

The use of a metal anode electrolytic method has also been proposed for emulsified oil wastewater treatment. This method mainly involves electrolysis of dissoluble metal anode (iron anode) to produce metallic ferrous ions, employing the principle of electric charge equilibrium. Concurrently, metal ions form flocculent hydroxide in water that function as adsorbents, and the resulting oily floccules are floated to the top and removed. The method requires a treatment tank of large capacity and involves treatment of a huge amount of solid floccules, and the dissoluble electrodes used in this prior method have short lifespan. Therefore, the method is still not suitable for treatment of oily wastewater of vessels.

BRIEF SUMMARY OF THE INVENTION

The present invention aims to overcome the deficiency of the existing technologies by providing a method using oxidative electrolysis and particle group electrolysis for treating wastewater containing emulsified oil from vessels, suitable for emulsified oil wastewater treatment of oily water from vessels. The treatment method is effective, the lifespan of the electrode is long, no secondary pollution is produced, and the cost of the method is low. The area required for the equipment using this technology is small, and no solid sediments are produced while the treated water meets the discharge standards of below 15 ppm in oil content.

In one embodiment of the present invention, a method for treating wastewater that contains emulsified oil is provided. The method comprises feeding the wastewater that contains the emulsified oil to an electrolytic tank and oxidatively electrolyzing the wastewater that contains the emulsified oil using indissoluble electrodes. The negatively charged emulsified oil particles in the wastewater are neutralized on a surface of an anode during the oxidative electrolysis. The anode comprises an indissoluble electrode with oxygen radical-generating characteristics. The method further comprises particle group electrolyzing the wastewater using particle groups, and discharging the treated wastewater. An apparatus for carrying out this method is also disclosed.

DETAILED DESCRIPTION OF THE INVENTION

Figure 1:
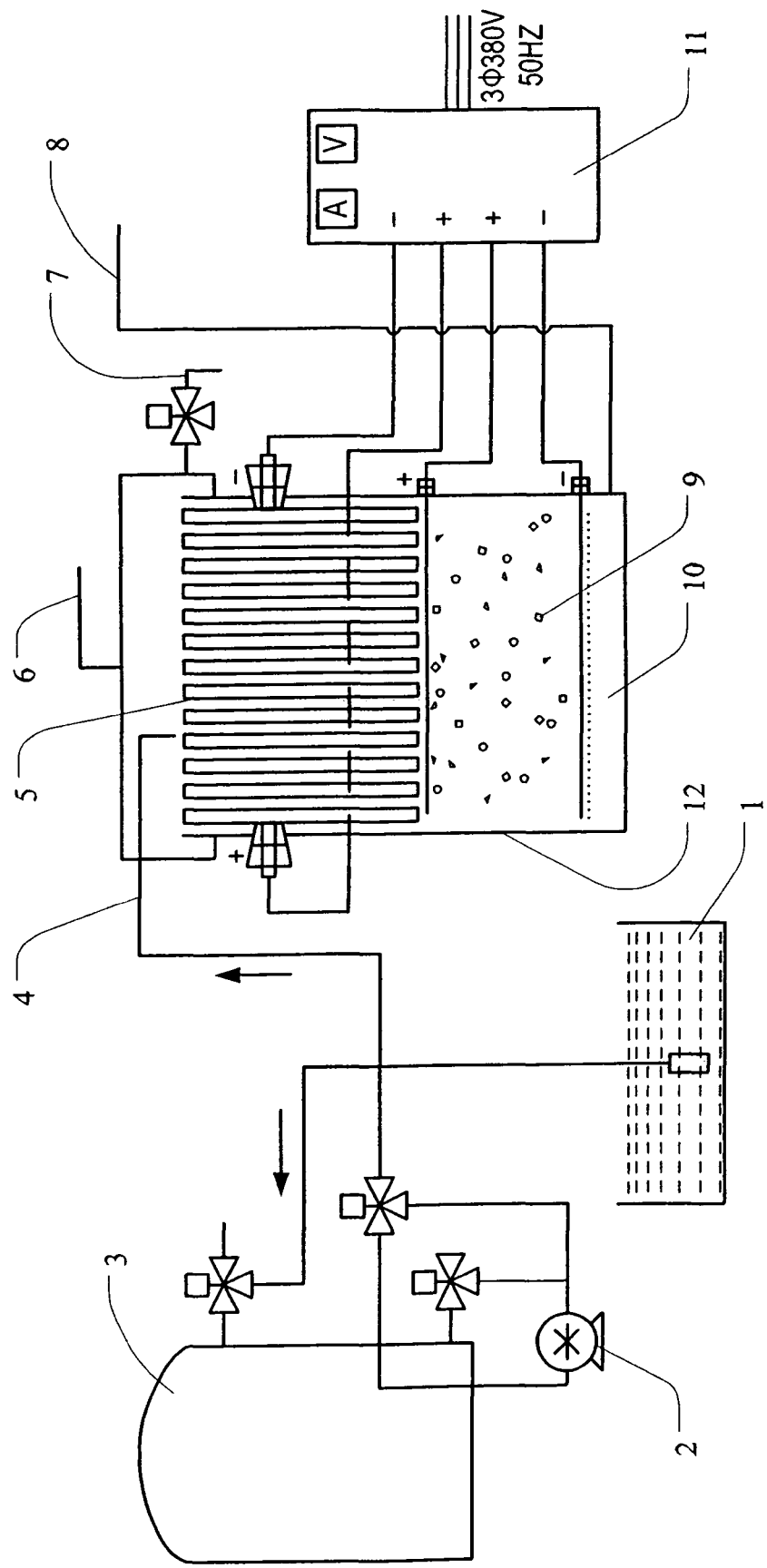
FIG. 1 is an illustration of equipment configuration according to one aspect of the present invention.

According to one embodiment of the present invention, the method comprises electrolysis of emulsified oil. During the electrolysis process, the electric charges carried by the emulsified oil particles are negative and neutralized at the anodic surface, where oil aggregates are produced as a result of de-emulsification, and where small droplets of oil accumulate to become larger conglomerates and float upwards to the upper part of the electrobath. The electrolysis process uses indissoluble electrodes with oxygen radical-generating characteristics for anodes. Besides being able to neutralize the negative electric charges carried by the emulsified oil particles during the process of electrolysis, these types of anodes can at the same time perform an electrolytic reaction that produces hydroxyl radical OH; which reacts with the emulsified oil particles and thereby accelerates the rate of de-emulsification. No solid sediments are produced. Water treated by the electrolysis process using indissoluble electrodes can be further treated by particle group electrolysis to meet varying needs and discharge standards before being discharged.

The voltaic concentration of the electrolysis process using indissoluble electrodes is about 1.4~1.6 Ah/L and the electrolytic time thereof is about 8~15 minutes.

The electrolytic current of the particle group electrolysis is about 5~10 A, the voltage thereof is about 30~50V, and the electrolytic time thereof is about 6~8 minutes.

In electrolytic treatment of oily wastewater, electrodes that are typically used are made of ferroalloy or aluminous alloy and these electrodes are subject to electrolytic consumption and produce aluminous ions (or ironic ion, ferrous ions) that dissolve in water and produce hydroxide floccules. These ferrous or aluminous electrodes that involve electrolytic consumption are called dissoluble electrodes. Electrodes used in the present invention are of titanium metal base and coated with oxide. Oxygen radicals are generated in the micropores in the surface layer consisting of particles of titanium dioxide, tin oxide, iridium dioxide and the like when electrons enter the micopores. Oxygen radicals react with water to yield hydroxyl radicals. The electrodes transmit output electric current in the electrolysis process, and the electrodes themselves are not subject to any electrolytic consumption and are thus indissoluble electrodes with long lifespan.

Particle groups as mentioned herein are mainly active carbon particles mixed with insulating particles. Active carbon particles themselves are of very large surface areas, and usually serve as adsorbents in water treatment. Used as adsorbents, active carbon particles often need to be replaced when they are not as effective where adsorption limits are reached. According to one embodiment of the present invention, employing the principle that active carbon particles are electrically conductive, active carbon particles and insulating particles (such as ceramic, plastic, etc) are mixed such that the active carbon particles are segregated by insulating particles. The active carbon particles are polarized by an electric field and each active carbon particle becomes a primary cell. These primary cells form an uncountable number of primary cell electrolytic units when electric current is applied. Emulsified oil wastewater is electrolyzed on the surface of each active carbon particle where the emulsified oil is adsorbed.

The following examples are provided according to various embodiments of the present invention, and the equipment adopted in the examples is shown in FIG. 1.

Referring to FIG. 1, which discloses a preferred embodiment of the present invention, oily wastewater 1 is pumped by the water pump 2 to the gravitational and filtration-adsorption separator 3 where the non-emulsified oil in the wastewater is segregated by means of a conventional separation process. The oily wastewater then flows to the top of the electrobath 12 through the emulsified oil water inlet pipe 4. The wastewater proceeds to undergo a de-emulsification treatment by oxidative electrolysis at the indissoluble electrode 5 in the electrobath 12 where most of the emulsified oil particles are separated by de-emulsification and drops of oil accumulate at surface of the indissoluble electrode 5 in the electrobath 12. The small oil drops accumulate to become larger oil drops that float to the top while the water flows downwardly to reach the electrolytic particles 9 in the bottom of the electrobath 12. The electrolytic particles 9 are polarized under the effect of the electric field and function as an uncountable number of primary cells that perform additional de-emulsification at the anodic region of the small quantity of emulsified oil particles that have not been de-emulsified in oxidative electrolysis. The treated water flows to the treated water tank 10 and is discharged through the treated water discharge pipe 8. The discharged water can meet the discharge standard of 15 mg/L in oil content.

The electrolytic power supply 11 as shown in FIG. 1 may be a rectified power supply, the input alternative current power supply of which is AC 380V, 50 Hz, 3Ø (for power supply systems of Chinese vessels, or AC 440V, 60 Hz, 3Ø for Japanese, American and European vessels), and the output DC (direct current) voltage of which may be 0~70V. The output currents have two output routes, one of which is used for the indissoluble electrode 5 in electrolytic treatment unit during oxidative electrolysis, while the other is used for the electrolytic particles 9 in the particle group electrolytic treatment unit during electrolysis.

The following are embodiments of methods in accordance with the present invention for treating oily wastewater.

Example 1

Figure 2:
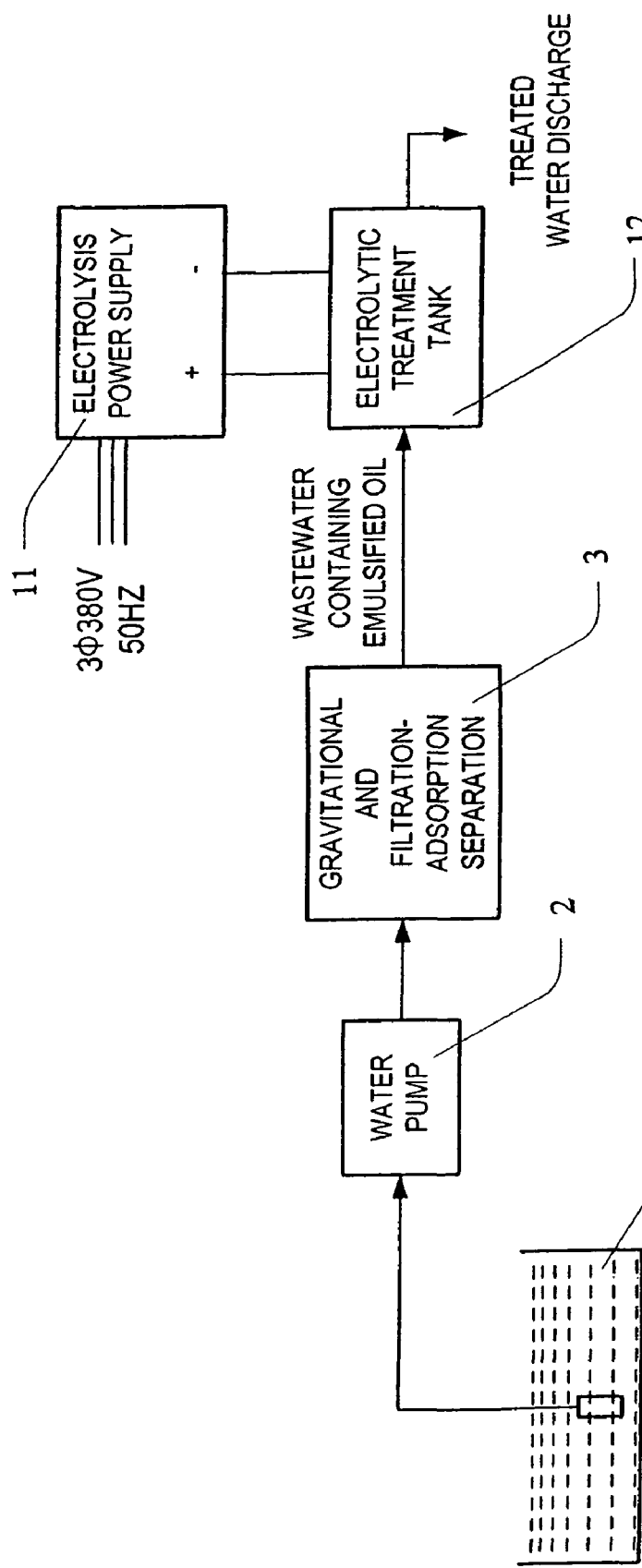
FIG. 2 is a flow diagram for a method in accordance with another embodiment of the present invention implementing the configuration of FIG. 1.
Figure 4:
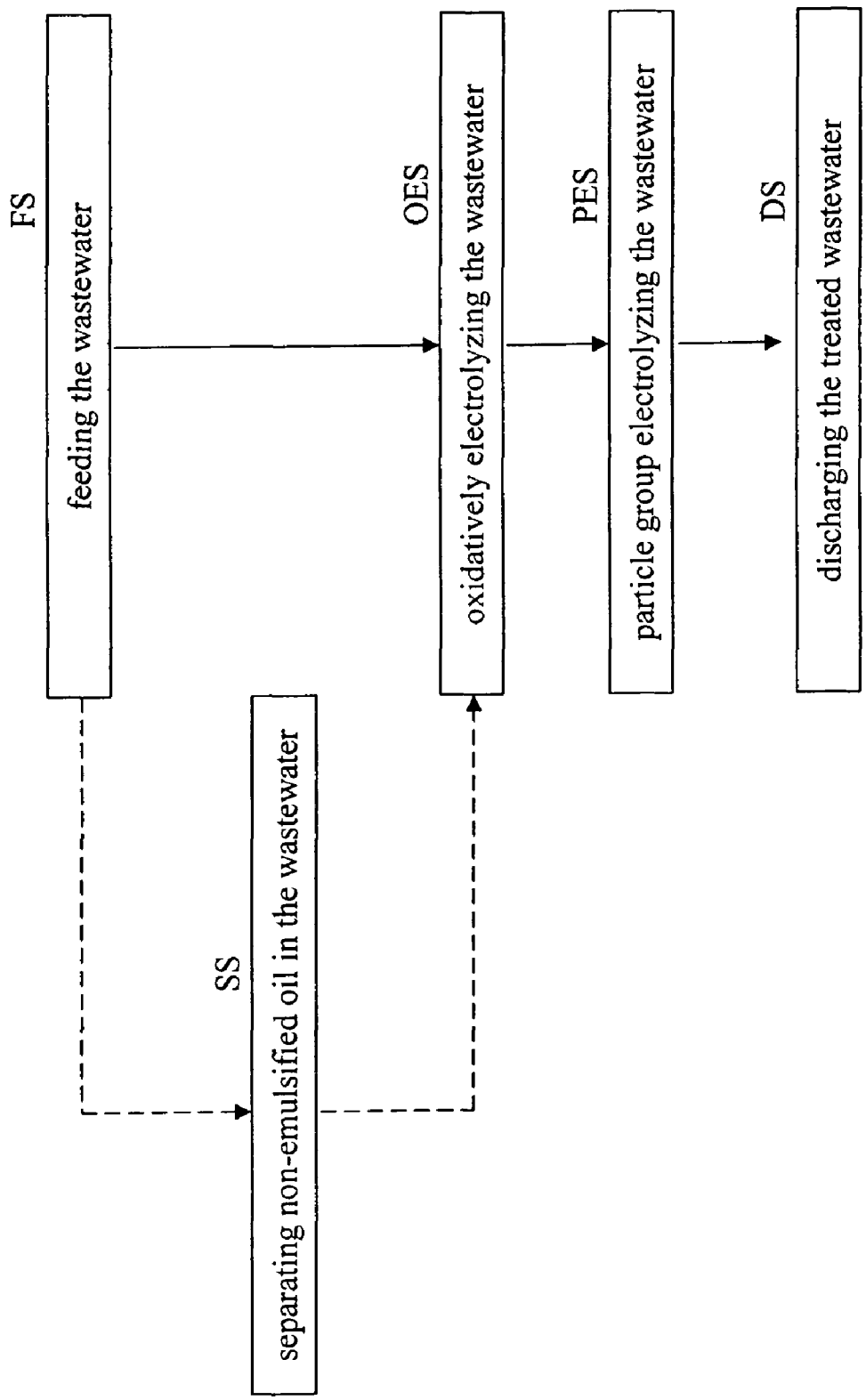
FIG. 4 is a method flow chart in accordance with yet another embodiment of the present invention.

Treatment of oily wastewater of one production workshop of a machinery manufacturing plant—the oil content of wastewater is 1,500 mg/L~60,000 mg/L, of which the concentration of emulsified oil is 600 mg/L. As shown in FIGS. 2 and 4, the treatment flow is as follows:

Oily wastewater 1 is pumped by the water pump 2 to the gravitational and filtration-adsorption separator 3, where the non-emulsified oil in the wastewater is separated by means of conventional separation process. The oily wastewater then flows to the top of the electrobath 12 through the emulsified oil water inlet pipe 4. The wastewater proceeds to undergo a de-emulsification treatment by oxidative electrolysis at the indissoluble electrode 5 in the electrobath 12 where most of the emulsified oil particles are separated by de-emulsification. The separated oil floats to the top while the water flows downwardly to reach the electrolytic particles 9 at the bottom of the electrobath 12. The emulsified oil particles that have not been de-emulsified in oxidative electrolysis are further electrolyzed and de-emulsified. The treated water then flows to the treated water tank 10 and is discharged through the treated water discharge pipe 8. The oil that has floated to the top is discharged through the oil discharge pipe 7, while gas produced by electrolysis is discharged through the vent pipe 6.

a: Treatment capacity of unit: 250 L/hour b: Treatment equipment:

Electrolytic power supply: rectified power supply with two output routes; alternative current input AC 380V, 50 Hz, 3Ø. Direct current output DC voltage 0~70V (adjustable).

Electrobath: total capacity 70 L; of which the part of indissoluble anodic electrolysis capacity being 35 L, the part of particle group electrolysis capacity being 25 L, and the part of treated water tank capacity being 10 L.

The indissoluble anodes are oxygen radical-generating metallic oxide electrodes. The cathodes are made of ordinary steel materials. The particle groups are a mixture of active carbon particles and plastic particles. The anodes and cathodes used are ordinary indissoluble electrodes.

c: Electrolysis parameters:

The voltaic concentration of the electrolysis process using indissoluble electrodes is 1.4~1.6 Ah/L (note: Current×Number of Indissoluble Anodes/Volume of Water Being Treated); and the electrolytic time thereof is 8 minutes.

The electrolytic current of the particle group electrolysis is 5 A, the voltage thereof is 30V, and the electrolytic time thereof is 6 minutes.

d: Treatment results: After electrolytic treatment of emulsified oil wastewater, the oil content of the discharged water is 15 mg/L, thus meeting the discharge standard.

Example 2

Figure 3:
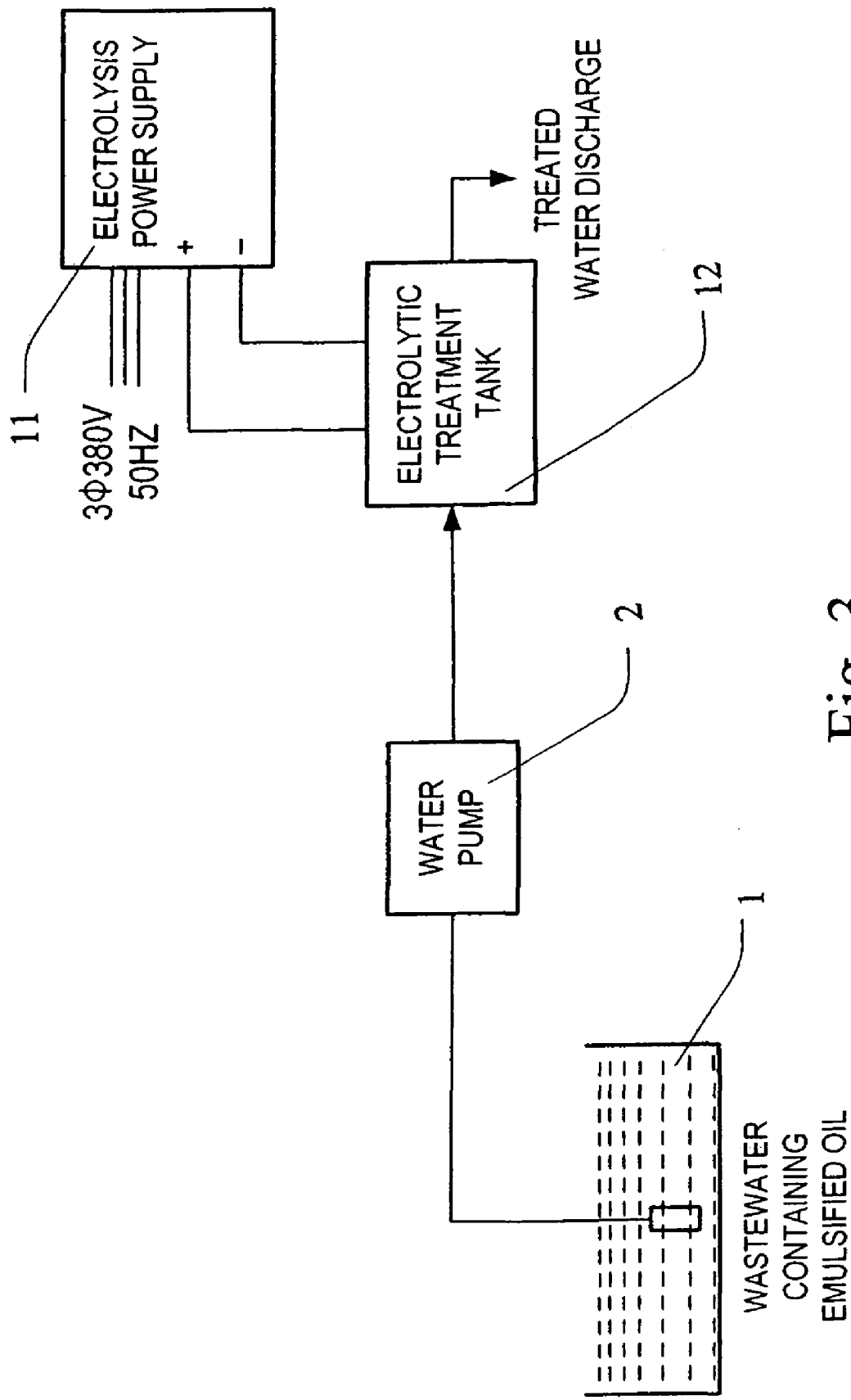
FIG. 3 is a flow diagram illustrating yet another embodiment of the present invention.

Treatment of oily wastewater of one production test workshop—the oil content of wastewater (measured by ultraviolet spectroscopy) is 1,000 mg/L. As shown in FIGS. 3 and 4, the treatment flow is as follows:

Emulsified oil wastewater 1 is pumped by the water pump 2 to the top of the electrobath 12 and undergoes de-emulsification treatment by oxidative electrolysis at the indissoluble electrode 5 in the electrobath 12 where most of the emulsified oil particles are separated by de-emulsification. The separated oil floats to the top while the water flows downwards to reach the electrolytic particles 9 at the bottom of the electrobath 12. The emulsified oil particles that have not been de-emulsified in oxidative electrolysis are further electrolyzed and de-emulsified. The treated water flows to the treated water tank 10 and is discharged through the treated water discharge pipe 8. The oil that has floated to the top is discharged through the oil discharge pipe 7, while gas produced by electrolysis is discharged through the vent pipe 6.

a: Treatment capacity of unit: 300 L/hour b: Treatment equipment:

Electrolytic power supply: Rectified power supply with two output routes; alternative current input AC 380V, 50 Hz, 3Ø. Direct current output DC voltage 0~70V (adjustable).

Electrobath: Total capacity 105 L; of which the part of indissoluble anodic electrolysis capacity being 60 L, the part of particle group electrolysis capacity being 35 L, and the part of treated water tank capacity being 10 L.

The indissoluble anodes are oxygen radical-generating metallic oxide electrodes. The cathodes are made of ordinary steel materials. The particle groups are mixture of active carbon particles and plastic particles. The anodes and cathodes used are ordinary indissoluble electrodes.

c: Electrolysis parameters:

The voltaic concentration of the electrolysis process using the indissoluble electrode is 1.5 Ah/L; and the electrolytic time thereof is 12 minutes.

The electrolytic current of the particle group electrolysis is 7.5 A, the voltage thereof is 40 V, and the electrolytic time thereof is 7 minutes.

d: Treatment results: The oil content of the treated water is 13 mg/L.

Example 3

Treatment of emulsified oil wastewater of one emulsified oil wastewater processing and refrigeration plant—the concentration of the emulsified oily is 2,000 mg/L after the wastewater is mixed with water. As shown in FIGS. 3 and 4, the treatment flow is as follows:

Emulsified oil wastewater 1 is pumped by the water pump 2 to the top of the electrobath 12 and undergoes de-emulsification treatment by oxidative electrolysis at the indissoluble electrode 5 in the electrobath 12 where most of the emulsified oil particles are separated by de-emulsification. The separated oil floats to the top while the water flows downwardly to reach the electrolytic particles 9 at the bottom of the electrobath 12. The emulsified oil particles that have not been de-emulsified in oxidative electrolysis are further electrolyzed and de-emulsified. The treated water flows to the treated water tank 10 and is discharged through the treated water discharge pipe 8. The oil that has floated to the top is discharged through the oil discharge pipe 7, while gas produced by electrolysis is discharged through the vent pipe 6.

a: Treatment capacity of unit: 300 L/hour b: Treatment equipment:

Electrolytic power supply: Rectified power supply with two output routes; alternative current input AC 380V, 50 Hz, 3Ø. Direct current output DC voltage 0~70V (adjustable).

Electrobath: Total capacity 135 L; of which the part of the indissoluble anodic electrolysis capacity being 75 L, the part of the particle group electrolysis capacity being 40 L, and the part of the treated water tank capacity being 20 L.

The indissoluble anodes are oxygen radical-generating metallic oxide electrodes. The cathodes are made of ordinary steel materials. The particle groups are a mixture of active carbon particles and plastic particles. The anodes and cathodes used are ordinary indissoluble electrodes.

c: Electrolysis parameters:

The voltaic concentration of the electrolysis process using indissoluble electrode is 1.6 Ah/L; and the electrolytic time thereof is 15 minutes.

The electrolytic current of the particle group electrolysis is 10 A, the voltage thereof is 50 V, and the electrolytic time thereof is 8 minutes.

d: Treatment results: The oil content of treated water measures 8 mg/L.

Referring to FIGS. 1 and 4, in the method for treating wastewater that contains emulsified oil, the wastewater that contains the emulsified oil 1 is fed to an electrolytic tank 12 in the feeding step (FS). Preferably, non-emulsified oil in the wastewater is separated from the wastewater containing emulsified oil 1 by a conventional separation process in the separating step (SS) before the oxidatively electrolyzing step (OES). In the OES step, the wastewater that contains the emulsified oil 1 is oxidatively electrolyzed using indissoluble electrodes 5, wherein negatively charged emulsified oil particles in the wastewater are neutralized on a surface of an anode during the oxidative electrolysis. The anode comprises an indissoluble electrode with oxygen radical-generating characteristics. The wastewater can be further electrolyzed using particle groups 9 in the particle group electrolyzing step (PES). The treated wastewater is then discharged in the discharging step (DS).

In comparison with the existing technologies, the present invention has the following advantages:

(a) Exceptional treatment results: Repeated experiments indicate that efficiency of emulsified oil wastewater treatment with electrobath using indissoluble anodes can be above 95%. The efficiency can be increased to as high as above 99% if the electrolytic method using indissoluble anodes is combined with particle group electrolysis.

(b) Long lifespan: For method of treatment by membrane separation, treatment membranes are rapidly damaged when wastewater of high oil concentration is being treated. The indissoluble electrodes used in the present invention, however, do not involve self-consumption and have a lifespan of 5~10 years, while the active carbon particles for particle group electrolysis in the present invention serve as microelectrodes and the oil molecules absorbed to their surfaces are separated in the process of micro-cell electrolysis. The indissoluble electrodes can be cleaned by water to remove a small quantity of solid residues and can be used continuously. Therefore, the equipment for oxidative electrolysis and particle group electrolysis has longer lifespan than other products.

(c) Low manufacturing costs: The manufacturing costs of the oxidative electrodes and particle group electrodes used in the present invention are low. The manufacturing cost of equipment is approximately half that of membrane separation equipment and has even more distinctive cost advantages compared to biological reactors. As compared to other methods, the method of the present invention can be more readily promoted and generalized, enabling it to have a larger market share.

(d) Operational simplicity that facilitates automation of treatment technology: The operation of the treatment equipment of the present invention mainly involves control of electrolytic current. The magnitude of electrolytic current is directly related to the total treatment quantity. If the concentration of discharged water is on the high side after treatment, adjustment can be made to increase the electrolytic current; and if the input flow to the electrobath is too low and the oil content of wastewater is low, adjustment can be made to reduce the electrolytic current. The present invention enables automated operational control, using concentration alarm signals; whereas operational controls of membrane separation and biological reactor separation mainly rely on their original designs respectively and automation is difficult to achieve.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method for treating wastewater that contains emulsified oil, the method comprising:
    feeding the wastewater that contains the emulsified oil to an electrolytic tank;
    de-emulsifying a quantity of the emulsified oil contained in the wastewater by oxidative electrolysis using indissoluble electrodes, wherein negatively charged emulsified oil particles in the wastewater are electrically neutralized on a surface of an anode during the oxidative electrolysis, the anode comprising an indissoluble electrode with oxygen radical-generating characteristics;
    introducing the wastewater containing the remaining emulsified oil to the bottom of the electrolytic tank containing active carbon particles and insulating plastic particles;
    electrolyzing the wastewater containing the remaining emulsified oil to de-emulsify the remaining emulsified oil, using the active carbon particles mixed with the wastewater as electrodes; and
    discharging the treated wastewater,
    wherein the anode both neutralizes the negative charges on the emulsified oil particles and produces hydroxyl radicals during the oxidative electrolysis, the hydroxyl radicals reacting with the emulsified oil particles such that de-emulsifying the emulsified oil particles is accelerated and no solid sediments are produced throughout the oxidative electrolysis process by the electrodes.

2. The method of claim 1, wherein de-emulsifying the negatively charged emulsified oil particles produces oil aggregates that float upwardly to an upper part of the electrolytic tank.

3. The method of claim 1, wherein a voltaic concentration for the oxidative electrolysis using indissoluble electrodes is about 1.4~1.6 Ah/L.

4. The method of claim 1, wherein an electrolytic current for the particle group electrolysis is about 5~10 A.

5. The method of claim 1, wherein each of the indissoluble electrodes comprises a metal base coated with an oxide.

6. The method of claim 5, wherein the metal base comprises titanium.

7. The method of claim 5, wherein the oxide is selected from the group consisting of titanium dioxide, tin oxide, iridium dioxide, and combinations thereof.

8. The method of claim 1, wherein the active carbon particles are mixed with the insulating plastic particles, and the active carbon particles and the insulating plastic particles are disposed on the bottom of an electrobath.

9. The method of claim 1, further comprising separating non-emulsified oil in the wastewater from the wastewater containing emulsified oil by a conventional separation process before the de-emulsifying.

10. The method of claim 9, wherein the conventional separation process comprises a process using gravitational and filtration-adsorption separation.

11. The method of claim 4, wherein a voltage for the particle group electrolysis is about 30~50 V.

12. The method of claim 1, wherein the discharged wastewater has an oil content of about 15 mg/L or less.

* * * * *